(12) United States Patent
Chiang

(10) Patent No.: US 7,573,657 B2
(45) Date of Patent: Aug. 11, 2009

(54) LENS MODULE

(75) Inventor: Tsung-Wei Chiang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/947,073

(22) Filed: Nov. 29, 2007

(65) Prior Publication Data

US 2008/0266680 A1 Oct. 30, 2008

(30) Foreign Application Priority Data

Apr. 30, 2007 (CN) .................. 2007 1 0200580

(51) Int. Cl.
G02B 7/02 (2006.01)
(52) U.S. Cl. ..................... 359/819; 359/811
(58) Field of Classification Search ................ 359/819
See application file for complete search history.

(56) References Cited

U.S. PATENT DOCUMENTS

2005/0168846 A1* 8/2005 Ye et al. ..................... 359/819
2006/0221469 A1* 10/2006 Ye ............................. 359/811
2007/0217783 A1 9/2007 Nishijima

* cited by examiner

Primary Examiner—Jordan M. Schwartz
Assistant Examiner—James C Jones
(74) Attorney, Agent, or Firm—Frank R. Niranjan

(57) ABSTRACT

A lens module includes a first lens, a second lens having a flat end surface and a cylindrical peripheral side surface, and a lens barrel. The lens barrel includes a hollow cylindrical body having a first end and an opposite second end, and a cap at the first end of the hollow cylindrical body. The cylindrical body has an inner space with the first lens received therein. The cap has a through hole defined therein and an inner annular step support formed on an inner surface of the cap in the through hole. The inner support has a first flat surface and an opposite second surface. The second lens is received in the throught hole with the flat end surface contacting with the first flat surface of the inner support and the cylindrical peripheral side surface contacting with the inner surface of the cap.

4 Claims, 6 Drawing Sheets

LENS MODULE

BACKGROUND

1. Technical Field

The present invention relates to lens modules, and particularly to a lens module using a lens barrel for receiving lenses thereof.

2. Description of Related Art

With the ongoing development of microcircuitry and multimedia technology, camera modules, including, e.g., still camera modules and digital camera modules are now in widespread use and are being combined with various electronic devices. Such camera modules are required to have excellent optical characteristics.

A camera module of the related art includes at least one lens module and an image sensor, the image sensor is in alignment with the at least one lens module. Referring to FIG. 5, the at least one lens module 200 typically includes a lens barrel 22 and a number of components received in the lens barrel 22. The lens barrel 22 has an inner space 221 and a through hole 222 communicating with the inner space 221. The components include a number of lenses 21, 23, 25, spacers 24, 26 and a filter 27. Due to a requirement of optical design, the lens 21 is configured in the through hole 222, the other components are configured in the inner space 221. However, referring to FIG. 6, the lens barrel 22 makes it difficult for the lens 21 to be received in the through hole 222 thereof.

What is needed, therefore, is a lens module wherein all the lenses can be more easily received in a lens barrel thereof.

SUMMARY

In a present embodiment, an exemplary lens module includes a first lens, a second lens and a lens barrel. The second lens has a flat end surface and a cylindrical peripheral side surface. The lens barrel includes a hollow cylindrical body having a first end and an opposite second end, and a cap at the first end of the hollow cylindrical body. The hollow cylindrical body has an inner space with the first lens received therein and a through opening at the second end communicating with the inner space. The cap has a through hole therein communicating with the inner space of the hollow cylindrical body, and an inner annular step support formed on an inner surface of the cap in the through hole. The inner annular step support has a first flat surface and an opposite second surface facing toward the second end of the hollow cylindrical body. The second lens is received in the through hole of the cap with the flat end surface contacting with the first flat surface of the inner annular step support and the cylindrical peripheral side surface contacting with the inner surface of the cap. The first lens and the second lens are axially aligned with each other.

Other advantages and novel features of the present invention will become more apparent from the following detailed description of preferred embodiment when taken in conjunction with the accompanying drawings.

BRIEF DESCRIPTION OF THE DRAWINGS

Many aspects of the lens module can be better understood with reference to the following drawings. The components in the drawing are not necessarily drawn to scale, the emphasis instead being placed upon clearly illustrating the principles of the present lens module. Moreover, in the drawings, like reference numerals designate corresponding parts throughout the several views.

DETAILED DESCRIPTION OF THE PREFERRED EMBODIMENTS

Embodiments of the present lens module will now be described in detail below and with reference to the drawings.

Figure 1:
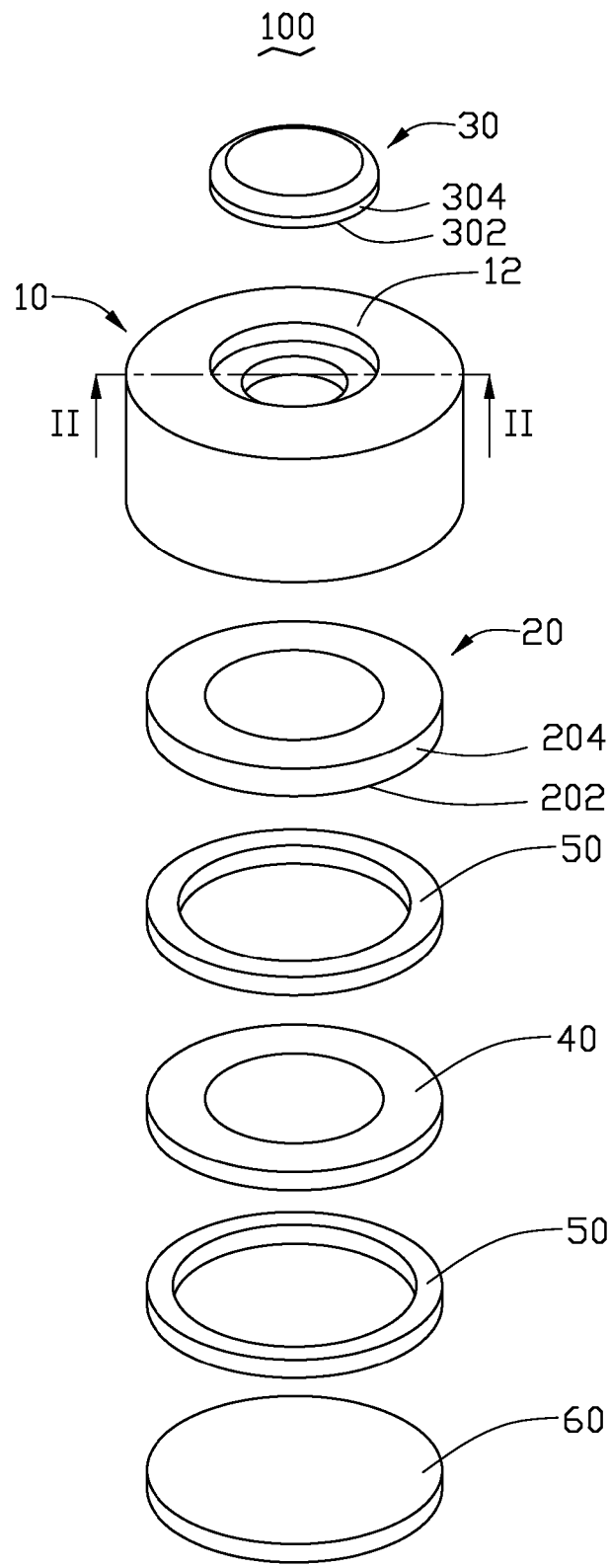
FIG. 1 is an exploded view of a lens module according to a present embodiment of the present invention.
Figure 2:
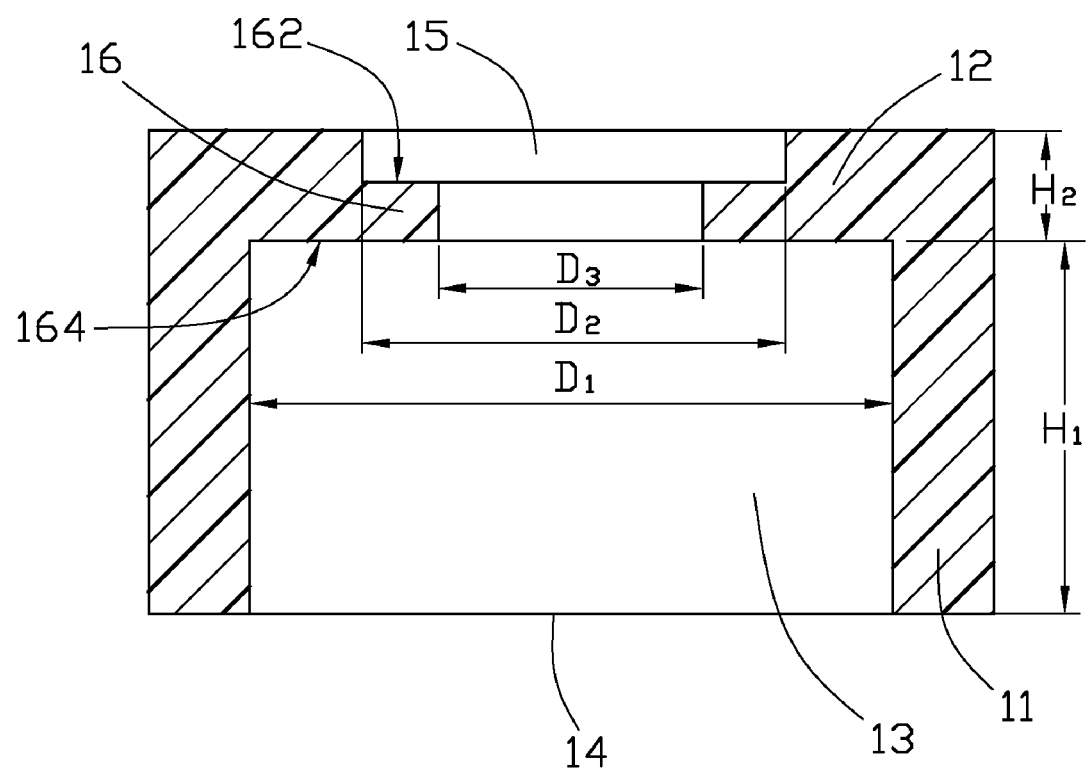
FIG. 2 is a cross-sectional view taken along line II-II of the lens barrel shown in FIG. 1.

Referring to FIGS. 1 and 2, an exemplary lens module 100 includes a lens barrel 10, a first lens 20, a second lens 30, a third lens 40, two spacers 50 and a filter 60.

The lens barrel 10 includes a hollow cylindrical body 11 having a first end and an opposite second end, and a cap 12 at the first end of the hollow cylindrical body 11. The hollow cylindrical body 11 has an inner space 13 and a through opening 14 at the second end communicating with the inner space 13. The cap 12 has a through hole 15 therein communicating with the inner space 13, and an inner annular step support 16 formed on an inner surface of the cap 12 in the through hole 15. The inner annular step support 16 has a first flat surface 162 and an opposite second flat surface 164 facing toward the second end of the hollow cylindrical body 11. An inner diameter $D_2$ of the through hole 15 is less than an inner diameter $D_1$ of the inner space 13 but greater than an inner diameter $D_3$ of the inner annular step support 16. A height $H_2$ of the through hole 15 (also the height of the cap 12) is less than a height $H_1$ of the inner space 13.

The first, second and third lens 20, 30, 40 each can be made of plastic or glass, and in a spherical or aspherical shape. The first and second lenses 20, 30 each have a flat end surface 202, 302 and a cylindrical peripheral side surface 204, 304.

Figure 3:
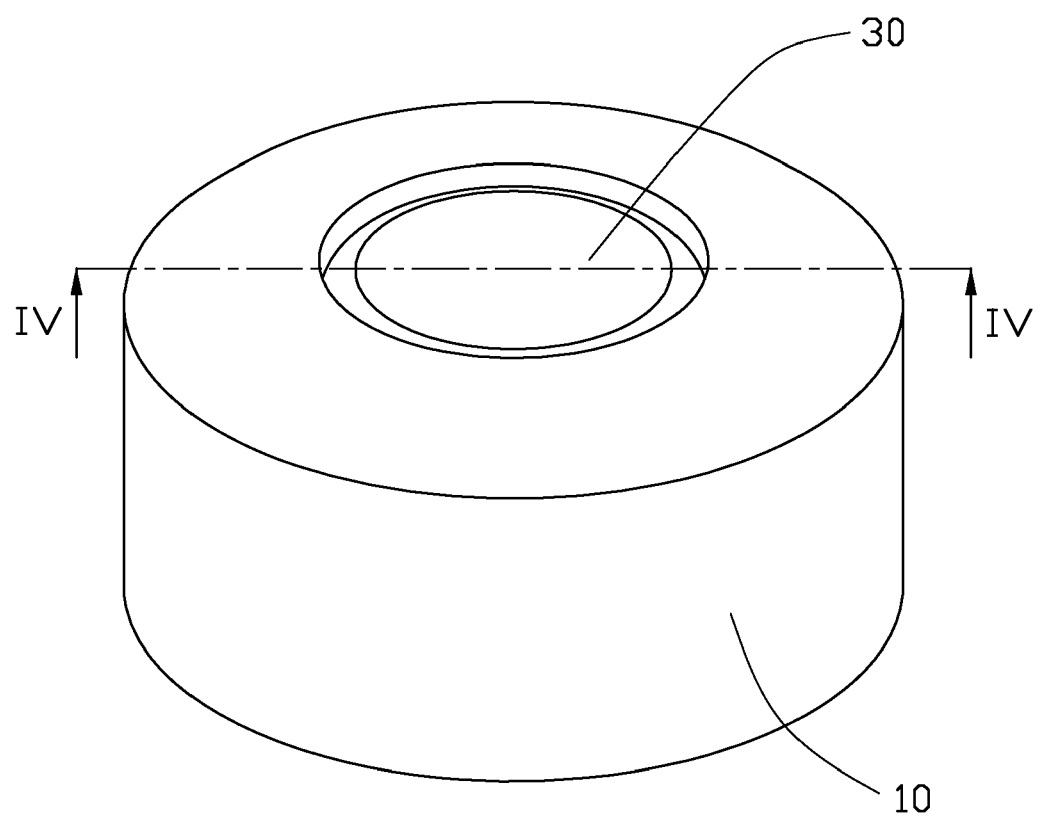
FIG. 3 is an assembled view of the lens module shown in FIG. 1.
Figure 4:
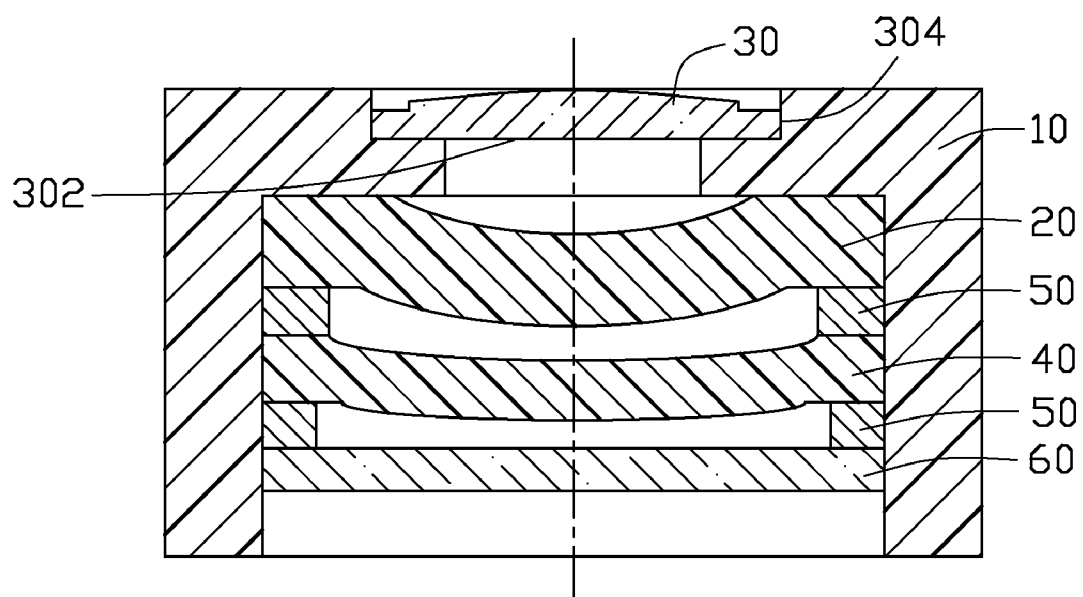
FIG. 4 is a cross-sectional view taken along line IV-IV of the lens module shown in FIG. 3.
Figure 5:
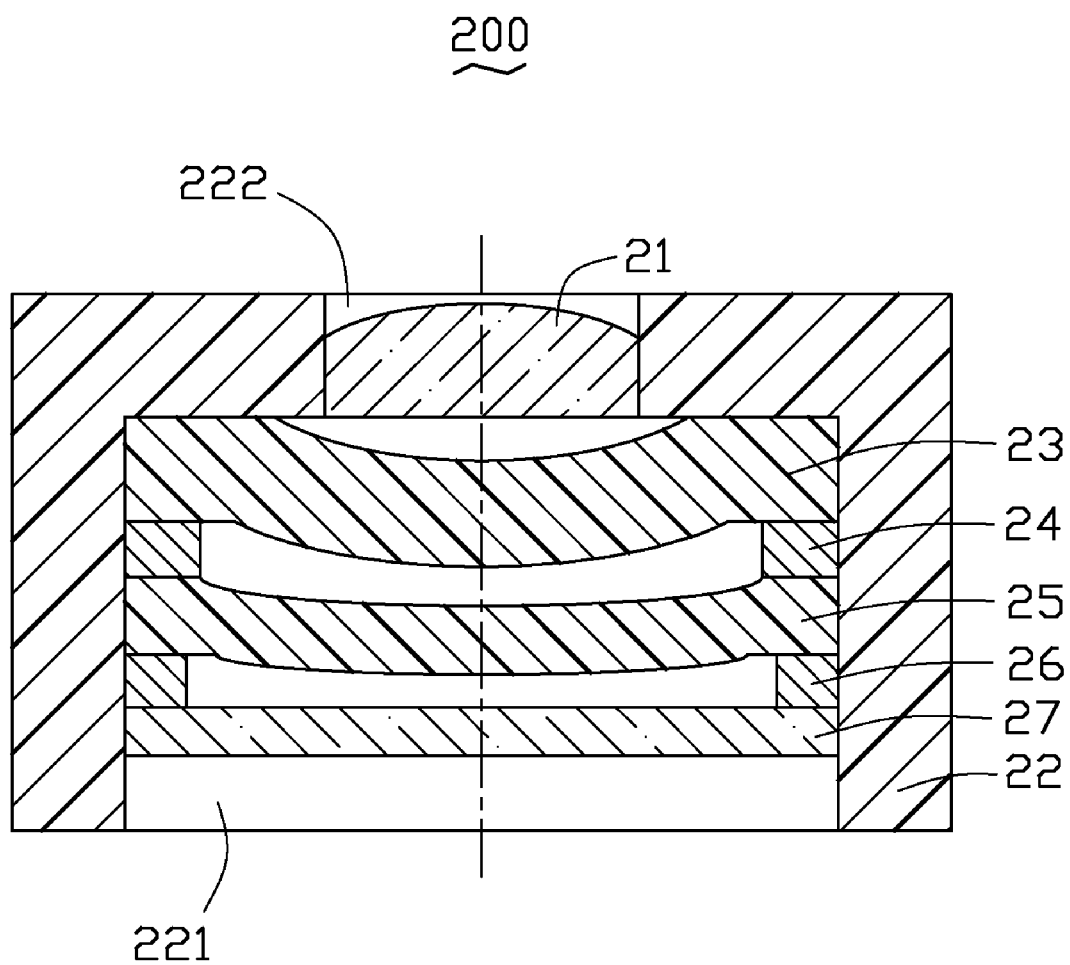
FIG. 5 is a schematic view of a conventional lens module.
Figure 6:
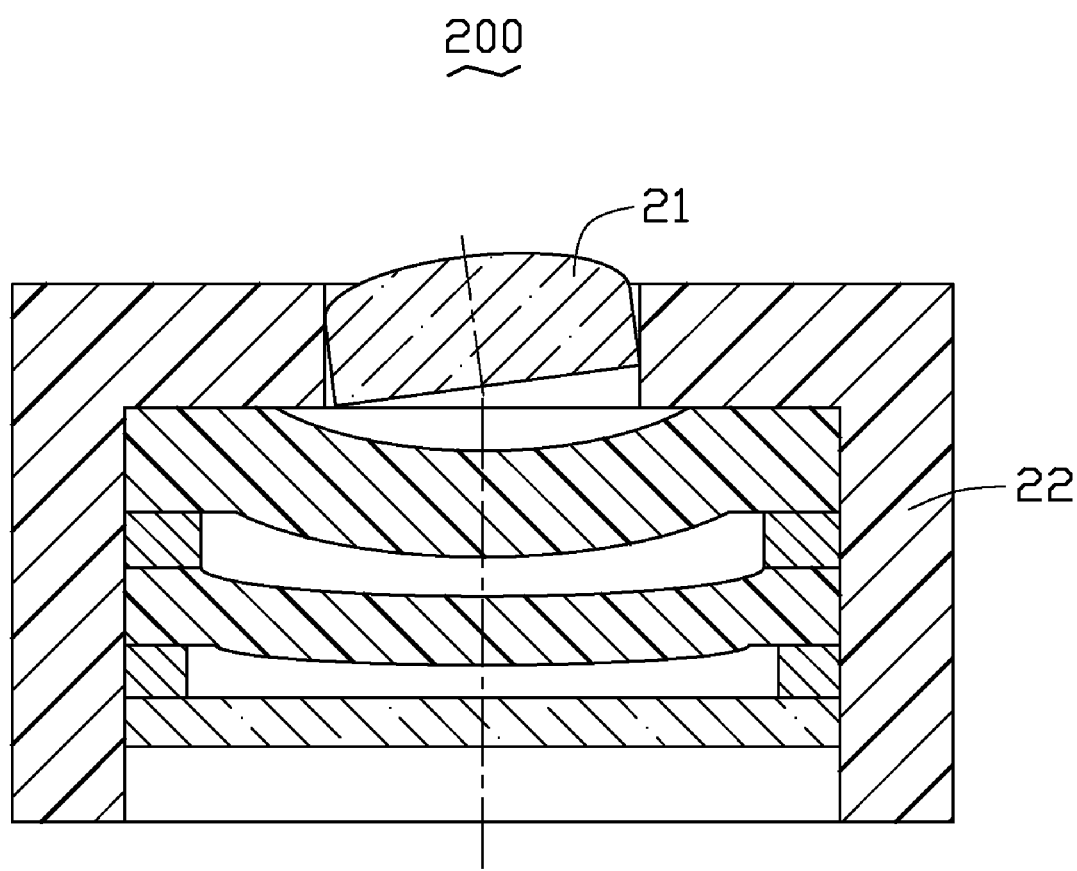
FIG. 6 is a schematic view showing an assembling process of the lens module shown in FIG. 5.

Referring to FIGS. 3 and 4, an assembled view of the lens module 100 is shown. The first lens 20 is received in the inner space 13 with the flat end surface 202 thereof contacting with the second flat surface 164 of the annular step support 16 and the cylindrical peripheral side surface 204 thereof contacting with an inner surface of the inner space 13. The second lens 30 is received in the through hole 15 with the flat end surface 302 thereof contacting with the first flat surface 162 of the annular step support 16 and the cylindrical peripheral side surface 304 thereof contacting with an inner surface of the through hole 15. Due to in contact with a flat surface of the annular step support 16, each of the first and second lenses 20, 30 can be steadily received thereon. The third lens 40 and the filer 60 each are also received in the inner space 13, and the first lens 20, the third lens 40 and the filter 60 are spaced apart by the two spacers 50. The first lens 20, the second lens 30 and the third lens 40 are axially aligned with each other.

The through hole 15 is smaller than the inner space 13, such that the through hole 15 can be used as a compensation for the inner space 13. The through hole 15 can just be used as a light incident opening when it is not needed. The second lens 30 can be a compensated lens for the first lens 20 and the third lens 40.

The lens module 100 can be cooperated with an image sensor (not shown) to become a camera module or to be used in varies of electronic devices.

It is understood that the above-described embodiments are intended to illustrate rather than limit the invention. Variations may be made to the embodiments and methods without departing from the spirit of the invention. Accordingly, it is appropriate that the appended claims be construed broadly and in a manner consistent with the scope of the invention.

What is claimed is:

1. A lens module, comprising:
   a first lens having a cylindrical peripheral side surface;
   a second lens having a flat end surface and a cylindrical peripheral side surface;
   a spacer;
   a third lens; and
   a lens barrel comprising:
   a hollow cylindrical body having a first end and an opposite second end, the hollow cylindrical body having an inner space with the first lens received therein and a through opening at the second end communicating with the inner space, an inner diameter of the hollow cylindrical body at the inner space being constant, the cylindrical peripheral side surface of the first lens contacting an inner surface of the hollow cylindrical body in the inner space, the spacer and the third lens being received in the inner space, the spacer being arranged upon the first lens, and the third lens being arranged upon the spacer, an outer diameter of the first lens being substantially equal to those of the spacer and the third lens; and
   a cap at the first end of the hollow cylindrical body, the cap having a through hole therein communicating with the inner space of the hollow cylindrical body and an inner annular step support formed on an inner surface of the cap in the through hole, the inner annular step support having a first flat surface and an opposite second surface facing toward the second end of the hollow cylindrical body, the second lens being received in the through hole of the cap with the flat end surface contacting the first flat surface of the inner annular step support and the cylindrical peripheral side surface contacting the inner surface of the cap, the first lens and the second lens axially aligned with each other.

2. The lens module as described in claim 1, wherein a height of the through hole is less than that of the inner space, and an inner diameter of the through hole is less than that of the inner space but greater than that of the inner annular step support.

3. The lens module as described in claim 1, wherein the inner annular step support is located where the through hole communicates with the inner space, and the second surface of the inner annular step support is flat.

4. The lens module as described in claim 3, wherein the first lens has a flat end surface contacting the second surface of the inner annular step support.

* * * * *